United States Patent [19]

Bernd et al.

[11] Patent Number: 5,048,196

[45] Date of Patent: Sep. 17, 1991

[54] POSITION SENSING ARRANGEMENT IN A WORKING DEVICE

[75] Inventors: Alfred Bernd, Herdecke; Anton Münzebrock, Dortmund; Heinz Pfannkuche, Bochum; Uwe Schulte; Roland Staggl, both of Wetter, all of Fed. Rep. of Germany

[73] Assignee: Mannesmann Aktiengesellschaft, Dusseldorf, Fed. Rep. of Germany

[21] Appl. No.: 342,455

[22] Filed: Apr. 21, 1989

[30] Foreign Application Priority Data

Apr. 21, 1988 [DE] Fed. Rep. of Germany ....... 3813897

[51] Int. Cl.$^5$ ........................... G01B 5/04; G01B 3/12
[52] U.S. Cl. ........................................ 33/734; 33/737; 33/744; 33/772; 33/776; 16/95 R; 16/94 R; 16/91
[58] Field of Search ................. 33/734, 735, 739, 744, 33/746, 753, 772, 773, 776, 737, 710, 711; 52/573; 16/90, 91, 94 R, 95 R, 102, 106

[56] References Cited

U.S. PATENT DOCUMENTS

| 2,790,243 | 4/1957 | St. Laurent | 33/734 |
| 2,795,853 | 6/1957 | Benfield, Jr. et al. | 33/772 |
| 2,876,549 | 3/1959 | Adamson | 33/734 |
| 2,936,524 | 5/1960 | Shaffer | 16/95 R |
| 3,284,906 | 11/1966 | Holleman | 33/737 |
| 3,798,705 | 3/1974 | Julian | 16/94 R |
| 3,802,082 | 4/1974 | Gornowitz | 33/772 |
| 3,936,943 | 2/1976 | Bullard, III | 33/711 |
| 4,068,384 | 1/1978 | Holy et al. | 33/776 |
| 4,195,410 | 4/1980 | Strohmeyer | 33/744 |
| 4,229,799 | 10/1980 | Herwig | 33/123 |
| 4,330,941 | 5/1982 | Haley | 33/776 |
| 4,555,853 | 12/1985 | Lenz | 33/711 |
| 4,773,791 | 9/1988 | Hartkorn | 52/573 |

FOREIGN PATENT DOCUMENTS 8902570 3/1989 World Int. Prop. O. ............ 33/744

Primary Examiner—William A. Cuchlinski, Jr.
Assistant Examiner—C. Fulton
Attorney, Agent, or Firm—Cohen, Pontani & Lieberman

[57] ABSTRACT

A guided working device (1) is driven by an operable traction motor (2) for movement along a travel rail (3). The working device carries a driver (4) provided with articulated heads for a measuring carriage (5), which measuring carriage always travels the same distance as the working device (1). The measuring carriage travels on a control rail (11) and includes a measuring device (6). A plurality of sliding conductors (17) are also receivable by the control rail (11). The measuring carriage carries a preferably toothed measuring wheel about at least a circumferential portion of which a preferably toothed measuring belt is wrapped. The measuring wheel (7) is pressed, by guided wheels (8) in front of and behind the measuring wheel, against a toothed belt supporting surface which is associated with the control rail (11).

19 Claims, 3 Drawing Sheets

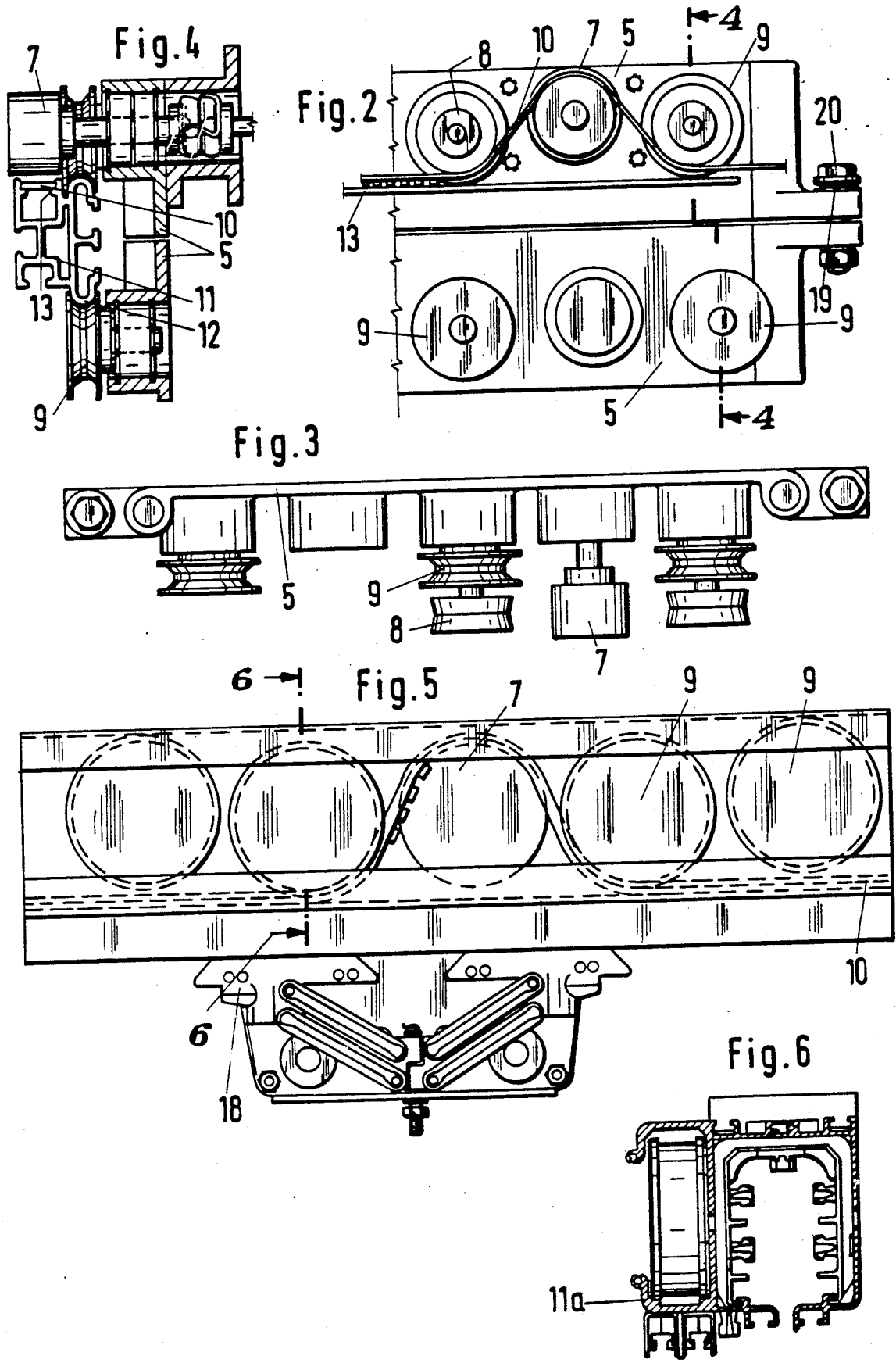

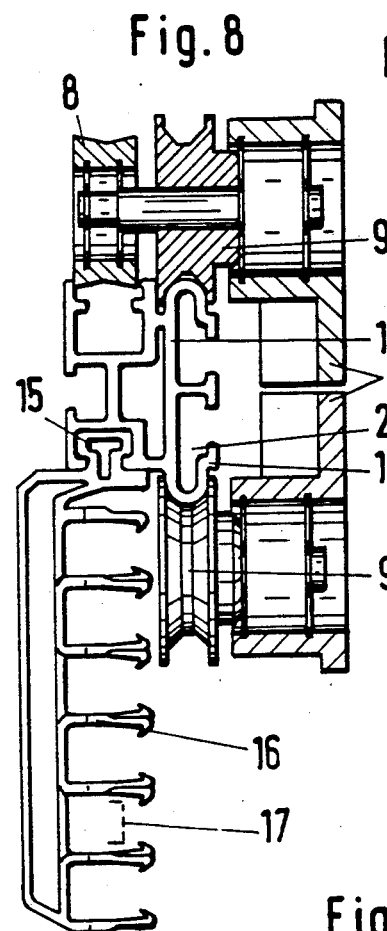
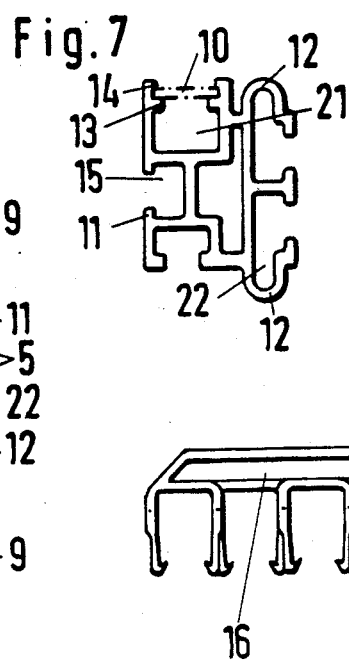
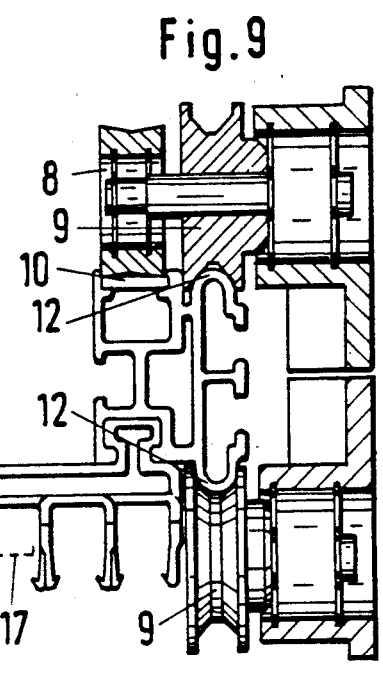
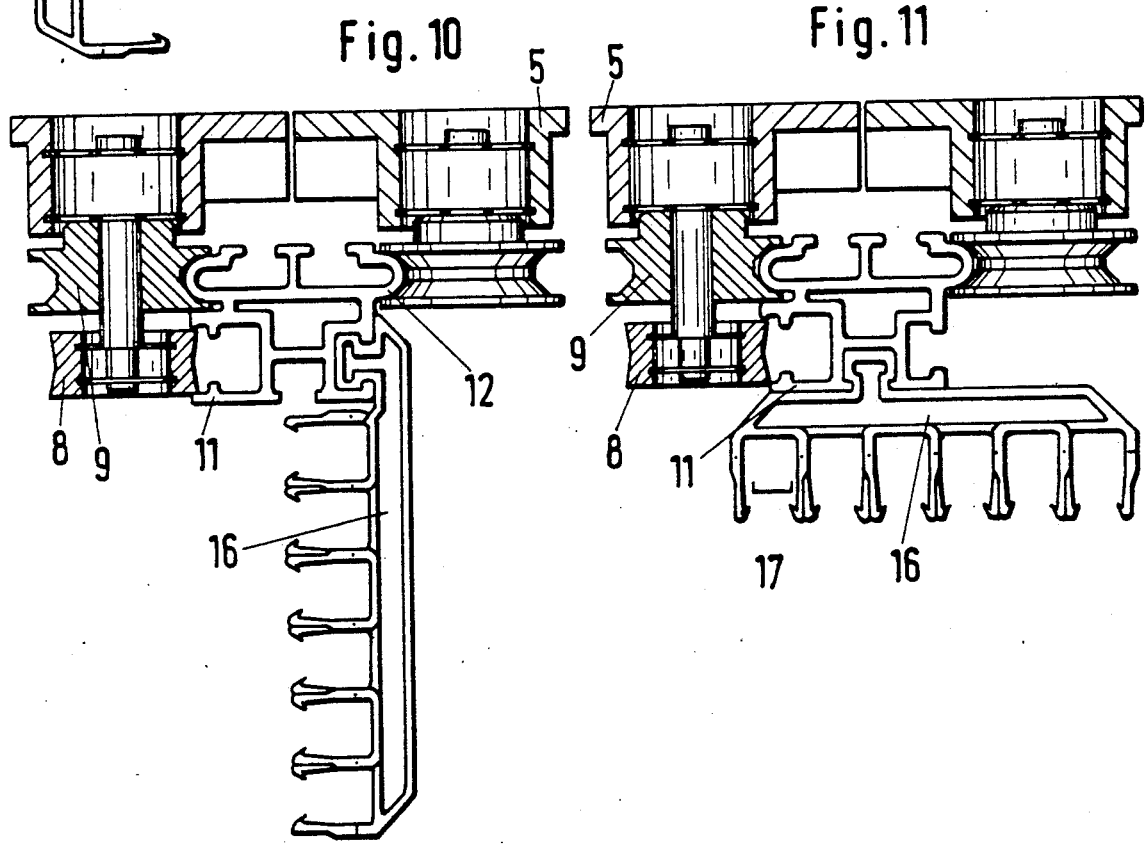

POSITION SENSING ARRANGEMENT IN A WORKING DEVICE

BACKGROUND OF THE INVENTION

The present invention relates to guided working devices having a drive operable for advancing or moving the device along a predefined path and, more particularly, to such a device wherein the drive is controlled in dependence on distance moved by the working device.

In the context of this invention and as used in the present disclosure, the term "working device" is intended to include, by way of example and without limitation, industrial robots, rack feeders, cranes, hoisting transporters, traversed carriages and machine slides and the like. The positioning of these movable working devices at positions along a path of travel requires a means of position determination and, in the case of a self-contained drive, further requires a means for supplying energy thereto. In working devices incorporating form-locked drives, position determination can be linked with the drive, as for example by way of a drive shaft. In devices employing frictional transmission of the drive force, distance or angle acquisition within the transmission chain of the drive force is in many instances too inexact or imprecise because of the introduction of slippage-induced measurement errors. In another heretofore known drive arrangement, a distance gauge located on or along the working device chassis is directly scanned utilizing, for example, coded rulers, or graduated scales, or sliding-contact resistors. These arrangements are expensive to implement and, for many applications, the resulting measurements do not result in a sufficient degree of accuracy particularly, for example, where an industrial robot or other working device is required to cover large distances to reach a position defined by or measured or scaled in millimeters.

It is therefore the object of the invention to provide, on or in association with a movably guided working device, an arrangement for enabling precise positioning of the device at any arbitrary working position along its travel path, independent of the particular drive or guidance apparatus of the working device.

SUMMARY OF THE INVENTION

The foregoing object is achieved and the noted deficiencies of the prior art overcome by providing, along a travel path of the working device, a control rail for a measuring carriage connected to the working device. The measuring carriage includes a measuring wheel which moves along and is rotatably driven through contact with a measuring band on the control rail. Rotations of the measuring wheel are communicated, by way of a path transmitter, to a distance-processing controller for use in controlling the drive means or apparatus by which the working device is moved along the travel path.

Sensing of the angular rotations of the measuring wheel, driven by the measuring band as the working device moves along its path, provides an extremely precise measurement for position determination. Thus, the measuring device, implemented as an angle transmitter, communicates the turns or rotations of the measuring wheel to the distance-processing control. The measuring carriage is so connected to the working device that both cover the same distance as the working device is moved by its drive means along a path.

Where the path of movement is particularly lengthy, there are provided in accordance with the invention expansion gaps disposed between several successive control rails or sections of control rail so as to accommodate thermal expansions and contractions of the individual control rails or rail sections. At the same time, the continuous measuring band is installed under initial tension and its ends are secured in fixed positions so that such thermal expansions and contractions do not negatively affect the accuracy of distance or positional measurements. With the herein-disclosed arrangement in accordance with the invention, desired positions along the travel path can be approached by the working device with an accuracy, for example, of 0.5 mm over working distances of 100 meters in length.

In a further embodiment of the invention, the measuring wheel is a toothed wheel and the measuring band is a correspondingly toothed belt supported by guide wheels carried on the measuring carriage in front of and behind (i.e. upstream and downstream of, respectively) the measuring wheel. The measuring carriage may be guided in its travel along the control rail by travel wheels captured or otherwise disposed for movement captively within and along a substantially C-shaped rail, or the measuring carriage may be guided for movement along outside travel surfaces of the control rail and may, in addition, be formed of two frame halves that are held together by springs. The measuring carriage of the invention includes travel wheels of Diabolo form directed toward one another for contact with oppositely-facing travel surfaces of the control rail which, in addition, has a generally U-shaped profile with two projections facing toward one another. These projections function as supporting surfaces for the measuring band which may be secured against inadvertent lifting from the supporting surfaces by positionally-associated retaining rims. The measuring band is pulled past the clamping or retaining rims and thus off of the supporting surfaces by the measuring wheel and is then pressed, by the following guide wheel, past the retaining rim and back into the supporting surface projections. The control rail may further include at least one insertion groove for receiving sliding conductor mounts as well as a groove for actuation of a limit switch.

The measuring carriage in accordance with the invention is connected to the working device by means of a driver which is provided with articulated heads so that the positions of these components relative to each other do not change. The working device is preferably movable on or along a travel rail which defines the path and is arranged parallel to the control rail, and may include a traction motor.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWING

In the drawing, wherein similar reference characters denote similar elements throughout the several views:

FIG. 2 is a side view of a measuring carriage in accordance with the invention;

FIG. 3 is top plan view of the measuring carriage of FIG. 2;

FIG. 4 is a sectional view taken along the lines IV—IV in FIG. 2;

FIG. 5 is a side view of a second embodiment of a measuring carriage in accordance with the invention;

FIG. 6 is a sectional view taken along the lines VI—VI in FIG. 5;

FIG. 7 is a cross-sectional view of a control rail in accordance with the invention; and FIGS. 8 to 11 are cross-sectional views of various arrangements of control rail, measuring carriage and sliding conductors in accordance with the invention.

DETAILED DESCRIPTION OF THE PREFERRED EMBODIMENTS

Figure 1:
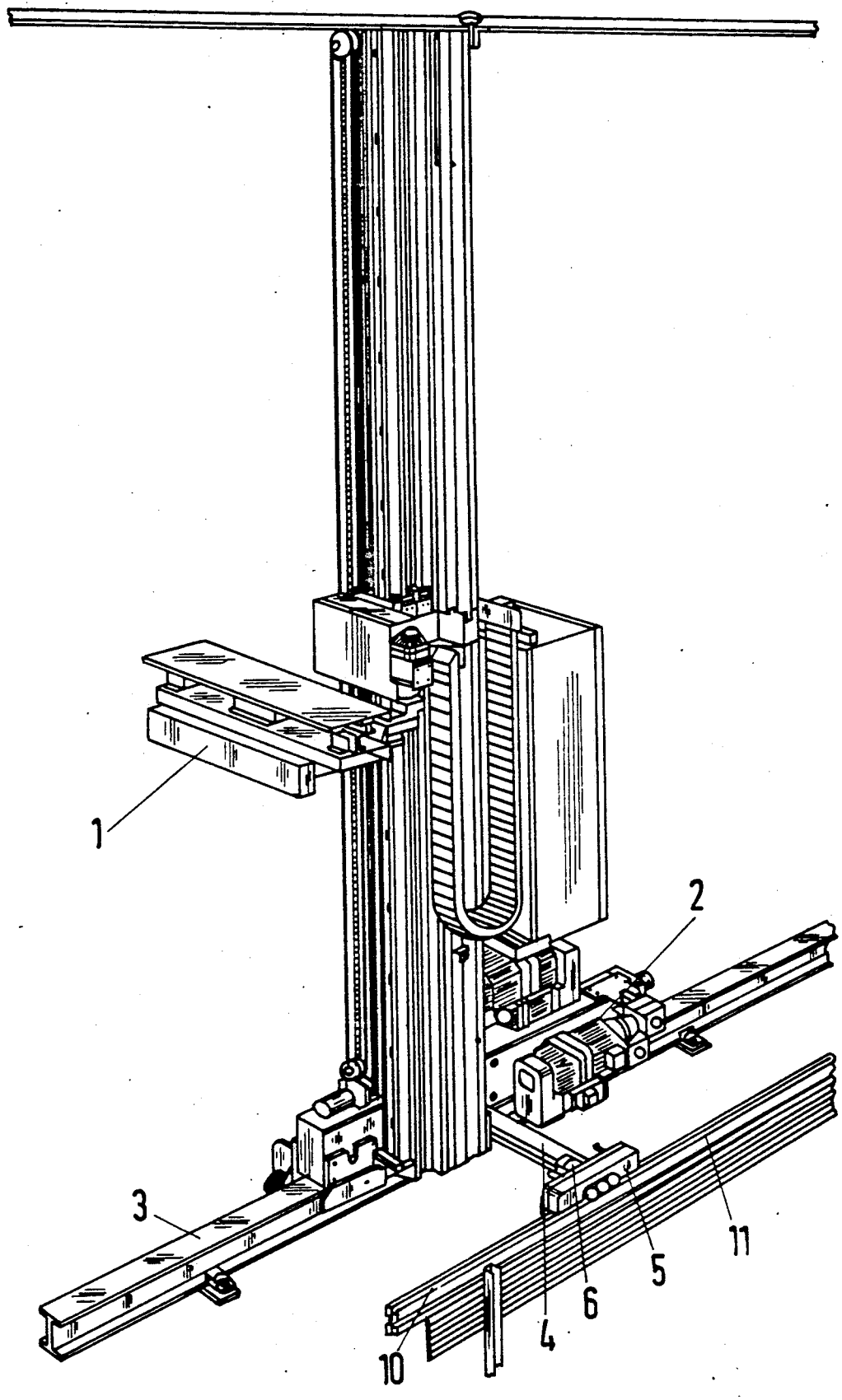
FIG. 1 is an elevated perspective view of a working device in accordance with the teachings of the present invention.

With initial reference to FIG. 1, a working device 1, driven by a traction motor 2, is disposed for movement on and along a travel rail 3. The working device 1 has a driver 4 which is provided with articulated heads for a measuring carriage 5 which includes a measuring device 6. The measuring device 6 may be implemented as an angle transmitter—such, for example, as the commercially available rotary encoder manufactured by Hewlett Packard as Model No. HEDS-6000. The measuring carriage is disposed for movement with and always travels the same distance as does the working device 1 as the measuring carriage moves along a control rail 11. A plurality of sliding conductors 17 (FIGS. 8, 9 and 11) are also fastened to or captured by the control rail 11.

As seen in FIGS. 2 and 4, the two frame halves of the measuring carriage 5 are secured one to the other by way of bolts 20 and associated springs 19. Carriage 5 carries travel wheels 9 which, under the urgency of the springs 19, are maintained in contact with the travel surfaces 12 of the control rail 11. In a preferred form of the invention, the travel wheels 9 have a substantially Diabolo-shaped contour for running contact with the substantially semicircularly-shaped travel surfaces 1 of the control rail 11.

In the form of the measuring carriage illustrated in the drawings three travel wheels 9 are arranged one behind another, thus permitting unhindered movement of the measuring carriage over even relatively large expansion joints in the control rail. The upper half or portion of the measuring carriage 5 carries a measuring wheel 7 which, in the illustrated form of the invention, comprises a toothed wheel circumferentially about approximately one-half of which a measuring band 10, in the form of a correspondingly toothed belt (FIG. 2), is wrapped. In front of (i.e. upstream) and behind (i.e. downstream of) the measuring wheel 7, the measuring band 10 is pressed by guide wheels against the projection-defined toothed belt supporting surfaces 13 which are associated with a control rail 11 (FIGS. 2 and 4). The continuous measuring band may advantageously be installed under initial tension, and its ends secured in fixed positions, so that thermal expansions and contractions of the control rail 11 do not negatively affect the accuracy of distance or positional measurements.

Rotations of the measuring wheel 7 are communicated, by way of the angle or path transmitter 6, to a distance processing controller (not shown) for use in controlling operation of the traction motor 4 or other driving apparatus by which the working device is moved along the travel path. The distance processing controller may comprise a commercially available device such, for example, as the Siemans "Simatic-IP 246".

In the second disclosed embodiment of the measuring carriage seen in FIGS. 5 and 6, the carriage 5 is adapted for movement in relatively captured relation within the rail 11a. Thus, the travel wheels 9 contact the travel surfaces at the top and bottom of the substantially C-shaped control rail 11a. The travel wheels 9 which are disposed adjacent to the measuring wheel 7 run on and along the measuring band 10 and thereby serve as guide wheels.

The control rail 11 is illustrated in enlarged scale in FIG. 7. The rail 11 may be formed in longitudinally-successive sections with an expansion gap defined between adjacently disposed sections to accommodate thermal expansions and contractions of the individual rail sections. The control rail 11 includes, in addition to substantially semicircular travel surfaces 12, two insertion grooves 15 for receiving sliding-conductor mounts such, for example, as those identified by the reference numeral 16 in FIGS. 8 to 11. One of these insertion grooves 15—that opposite the travel-surface side (i.e. opening to the left in FIG. 7)—concurrently forms the web base surface of a substantially U-shaped profile which includes flanges, the facing projections of which define a supporting surface 13 for the measuring band 10 depicted by dot-dash lines in FIG. 7. Associated with the flanges and located above the seated or operative position of the measuring band 10 are opposed clamping rims 14 past which the measuring band is movable only when pulled beyond those rims by a predetermined tension or force imparted by the measuring wheel 7 as the measuring carriage 5 moves along the control rail 11. The measuring band 10 thus serves as a cover or closure for a cavity 21 defined within the substantially U-shaped profile and affords protection against the entry of contaminating dust and moisture which can interfere with markings that may be applied therein for such purposes as, for example, scanning by optical sensors. The cavities partially enclosed by the travel surfaces 12 further form grooves 22 for actuation of a limit switch at the effective ends of or at other positions along the control rail 11.

In the embodiments of the invention illustrated in FIGS. 8 and 9, the travel surfaces 12 of the control rail 11 are arranged one above the other, with the travel wheels 9 of the measuring carriage 5 running along the travel surfaces 12 from above and below. In the arrangement of FIG. 8, downwardly extending mounts 16 for sliding conductors 17, depicted by dot-dash lines, are receivable in the lower insertion groove 15. In the arrangement of FIG. 9, the sliding conductor mounts 16, accessible from below, extend horizontally-outward from the measuring carriage.

In the embodiments of the invention illustrated in FIGS. 10 and 11, on the other hand, the control rail 11 and its travel surfaces 12 lie in a substantially horizontal orientation. Because the travel wheels 9 of the measuring carriage 5 are constructed as Diabolo-type rollers, they are and remain properly guided on the travel surfaces 12 even in the orientations there shown. The mounts 16 for the sliding conductors 17 extend downward in the arrangement of FIG. 10 and, in the arrangement of FIG. 11, lie horizontally so that the sliding conductors 17 are accessible from below by, for example, the current collector 18 illustrated in FIG. 5.

In order to facilitate pressed movement of the measuring band 10 beyond the retaining rims 14 so as to return the toothed-belt to supported relation on the supporting surface 13 following passage of the measuring wheel 7 on the measuring carriage 5, the peripheral face or travel surface of the guide wheels 8 is preferably formed having a somewhat concave configuration. This preferred shaping of the guide wheel surface can for example be seen in FIGS. 3 and 8 to 11.

While there have been shown and described and pointed out fundamental novel features of the invention as applied to preferred embodiments thereof, it will be understood that various omissions and substitutions and changes in the form and details of the devices illustrated and in their operation may be made by those skilled in the art without departing from the spirit of the invention. It is the intention, therefore, to be limited only as indicated by the scope of the claims appended hereto.

What is claimed is:

1. In a guided working device (1) including drive means (2) operable for selectively moving the working device along a travel path, the improvement comprising:
   a control rail (11) extending along the path;
   a measuring carriage (5) connected to the working device (1) for movement therewith along the path, said measuring carriage being disposed in at least closely proximate relation to said control rail (11);
   a measuring band (10) carried on said control rail (11);
   a measuring wheel (7) rotatably disposed on said measuring carriage (5) so that, as the working device operably moves along the travel path, said measuring wheel rotates on and relative to said measuring band (10) whereby said rotations of the measuring wheel provide a precise measure of the movement of the measuring carriage and working device along the travel path;
   means (6) comprising an angle transmitter for sensing said rotations of the measuring wheel; and
   a travel rail (3) extending along the travel path and on which the guided working device (1) is movable, said control rail (11) being arranged substantially parallel to said travel rail (3).

2. In a guided working device in accordance with claim 1, said control rail (11) comprising a plurality of control rail sections, and an expansion gap defined between and separating adjacently-disposed ones of said sections.

3. In a guided working device in accordance with claim 1, said measuring wheel comprising a toothed wheel and said measuring band comprising a continuous toothed belt.

4. In a guided working device in accordance with claim 1, said measuring band (10) comprising an elongated member extending between oppositely-disposed ends, and said ends being secured in fixed positions so as to place said measuring band under initial tension.

5. In a guided working device in accordance with claim 1, further comprising guide wheels (8) for the measuring band (10) carried by said measuring carriage (5) ahead of and behind said measuring wheel (7).

6. In a guided working device in accordance with claim 5, said control rail having a substantially C-shaped configuration, and further comprising travel wheels (9) carried on said measuring carriage (5) substantially adjacent to said measuring wheel (7) and being disposed rotatably within said C-shaped control rail for movement therewithin along said control rail.

7. In a guided working device in accordance with claim 5, said control rail including oppositely-facing travel surfaces (12), further comprising travel wheels (9) on said measuring carriage (5) and oriented toward one another for contact with said oppositely-facing travel surfaces (12) on the control rail (11), and said measuring carriage (5) comprising two frame halves and spring means (19) for urging said frame halves relatively one toward the other.

8. In a guided working device in accordance with claim 1, further comprising travel wheels (9) carried on said measuring carriage (5) and including travel surfaces (12) for guided rotation of said travel wheels on and along said control rail (11).

9. In a guided working device in accordance with claim 8, said travel wheels (9) comprising substantially Diabolo-shaped rollers.

10. In a guided working device in accordance with claim 1, said control rail (11) comprising a measuring band supporting surface (13) and clamping rims (14) for said measuring band (10).

11. In a guided working device in accordance with claim 10, said control rail (11) including webs defining a substantially U-shaped profile, and said measuring band supporting surface (13) being defined by two projections, oriented toward one another, that extend from said webs.

12. In a guided working device in accordance with claim 1, said control rail (11) including at least one insertion groove (15) for receiving a sliding-contact conductor mount (16).

13. In a guided working device in accordance with claim 1, said control rail (11) having at least one groove (22) for actuation of a limit switch.

14. In a guided working device in accordance with claim 1, further comprising a driver (4) connecting said measuring carriage (5) to the working device (1).

15. In a guided working device in accordance with claim 1, further comprising a travel motor (2) for moving said working device.

16. In a guided working device (1) including drive means (2) operable for selectively moving the working device along a travel path, the improvement comprising:
   a control rail (11) extending along the path and including oppositely-facing travel surfaces (12);
   a measuring carriage (5) connected to the working device (1) for movement therewith along the path, said measuring carriage being disposed in at least closely proximate relation to said control rail (11) and comprising two frame halves and spring means (19) for urging said frame halves relatively one toward the other;
   a measuring band (10) carried on said control rail (11);
   a measuring wheel (7) rotatably disposed on said measuring carriage (5) so that, as the working device operably moves along the travel path, said measuring wheel rotates on and relative to said measuring band (1) whereby said rotations of the measuring wheel provide a precise measure of the movement of the measuring carriage and working device along the travel path;

means (6) comprising an angle transmitter for sensing said rotations of the measuring wheel;
guide wheels (8) for the measuring band (10) carried by said measuring carriage (5) ahead of and behind said measuring wheel (7); and
travel wheels (9) on said measuring carriage (5) and oriented toward one another for contact with said oppositely-facing travel surfaces (12) on the control rail (11).

17. In a guided working device (1) including drive means (2) operable for selectively moving the working device along a travel path, the improvement comprising:
a control rail (11) extending along the path;
a measuring carriage (5) connected to the working device (1) for movement therewith along the path, said measuring carriage being disposed in at least closely proximate relation to said control rail (11);
a measuring band (10) carried on said control rail (11);
a measuring wheel (7) rotatably disposed on said measuring carriage (5) so that, as the working device operably moves along the travel path, said measuring wheel rotates on and relative to said measuring band (1) whereby said rotations of the measuring wheel provide a precise measure of the movement of the measuring carriage and working device along the travel path; and
means (6) comprising an angle transmitter for sensing said rotations of the measuring wheel;
said control rail (11) comprising a measuring band supporting surface (13) and clamping rims (14) for said measuring band (10), and including webs defining a substantially U-shaped profile;
said measuring band supporting surface (13) being defined by two projections, oriented toward one another, that extend from said webs.

18. In a guided working device (1) including drive means (2) operable for selectively moving the working device along a travel path, the improvement comprising:

a control rail (11) extending along the path and including at least one insertion groove (15) for receiving a sliding-contact conductor mount (16);
a measuring carriage (5) connected to the working device (1) for movement therewith along the path, said measuring carriage being disposed in at least closely proximate relation to said control rail (11);
a measuring band (10) carried on said control rail (11);
a measuring wheel (7) rotatably disposed on said measuring carriage (5) so that, as the working device operably moves along the travel path, said measuring wheel rotates on and relative to said measuring band (10) whereby said rotations of the measuring wheel provide a precise measure of the movement of the measuring carriage and working device along the travel path; and
means (6) comprising an angle transmitter for sensing said rotations of the measuring wheel.

19. In a guided working device (1) including drive means (2) operable for selectively moving the working device along a travel path, the improvement comprising:
a control rail (11) extending along the path and having at least one groove (22) for actuation of a limit switch;
a measuring carriage (5) connected to the working device (1) for movement therewith along the path, said measuring carriage being disposed in at least closely proximate relation to said control rail (11);
a measuring band (10) carried on said control rail (11);
a measuring wheel (7) rotatably disposed on said measuring carriage (5) so that, as the working device operably moves along the travel path, said measuring wheel rotates on and relative to said measuring band (1) whereby said rotations of the measuring wheel provide a precise measure of the movement of the measuring carriage and working device along the travel path; and
means (6) comprising an angle transmitter for sensing said rotations of the measuring wheel.

* * * * *